Patented Jan. 6, 1925.

1,521,708

UNITED STATES PATENT OFFICE.

SAMUEL PEACOCK, OF WHEELING, WEST VIRGINIA, ASSIGNOR TO WILLIS G. WALDO, OF WASHINGTON, DISTRICT OF COLUMBIA.

PROCESS OF MAKING AMMONIA FROM HYDROGEN AND NITROGEN.

No Drawing. Application filed January 12, 1923. Serial No. 612,317.

*To all whom it may concern:*

Be it known that I, SAMUEL PEACOCK, a citizen of the United States, residing at Wheeling, in the county of Ohio and State of West Virginia, have invented certain new and useful Improvements in Processes of Making Ammonia from Hydrogen and Nitrogen, and do hereby declare the following to be a full, clear, and exact description of the invention, such as will enable others skilled in the art to which it appertains to make and use the same.

This invention relates to a process for the making of ammonia from free hydrogen and nitrogen, and has for its object to provide a procedure which will be more expeditious and less costly to carry out than those heretofore proposed.

With these and other objects in view, the invention consists in the novel steps and combinations of steps constituting the process, all as will be more fully hereinafter disclosed and particularly pointed out in the claims.

This process involves the fixation of free gaseous nitrogen and a fixation of free gaseous hydrogen through the agency of aluminum nitride, and the obtaining of ammonia in the manner to be disclosed.

It is well known that aluminum nitride can be formed by reacting upon elemental aluminum with free nitrogen and this reaction forms no part of this invention. In carrying out this invention, however, aluminum hydride is heated to say 400° C. or 500° C. in a closed system out of contact with air or carbon dioxide, and a stream of free nitrogen in excess is passed rapidly over the heated hydride whereupon an ammonia forming reaction takes place substantially in accordance with the following equation:

$$Al_2H_6+2N_2=Al_2N_2+2NH_3.$$

The aluminum nitride thus formed is a solid and a mixture of free nitrogen and ammonia resulting from the procedure is withdrawn from the reaction zone as fast as it is formed and is then carried through any suitable separating apparatus for example an absorption system, which separates the ammonia from the free nitrogen, and the ammonia is thus recovered. The free nitrogen, of course, is cut off from the apparatus as soon as the above reaction is completed, and the aluminum nitride produced is conveniently left in the same apparatus, or it may be obtained from other sources, and a stream of free hydrogen in excess is passed over said aluminum nitride which is brought to the reacting temperature by any suitable means. The aluminum nitride is now converted back into aluminum hydride, although the reaction has a rather low velocity. Since aluminum hydride is liable to dissociate at higher temperatures, it is desirable to cool down the same to a point below say 300° C. and it is found that this cooling likewise promotes the reaction with the free hydrogen. This cooling effect may be accomplished either by a suitable water jacket or the hydrogen gas itself may be cooled before it is admitted to the aluminum nitride. The reaction now taking place may be stated as follows:

$$Al_2N_2+6H_2=Al_2H_6+2NH_3.$$

The aluminum hydride thus produced being a solid, the excess of hydrogen sweeps out the ammonia from the system as fast as it is formed and the mixed ammonia and free hydrogen is likewise passed through a suitable separator such for example as an absorption apparatus where the ammonia is absorbed and the free hydrogen recovered in the manner similar to the free nitrogen above mentioned. We now have in the apparatus produced aluminum hydride, and are back to the original starting point.

In other words, free nitrogen may be now again admitted to the apparatus and the cycle repeated. Each time that the free nitrogen or free hydrogen is admitted to the apparatus, a quantity of ammonia will be recovered, and the excess of nitrogen or hydrogen will be brought back to the process. In other words, by continuously repeating the cycle, free hydrogen and free nitrogen are continuously converted into the free ammonia.

The equilibrium involved in the formation of aluminum hydride from aluminum nitride and from hydrogen indicates the dissociation of only about 2% of the nitride, but by using the hydrogen stream over comparatively long periods of time, as much as from 80% to 85% of the nitride can be converted into ammonia and the hydride, thus rendering the process commercial. The aluminum hydride and the aluminum nitride is preferably employed in a finely divided condition and it is found convenient to associate these substances with finely divided asbestos or some such similar neutral material in the reaction chamber in order to expose as large surfaces as possible to the action of the gases.

What is claimed is:

1. The process of making ammonia which consists in heating aluminum hydride to a temperature above 400° C. at which it will react with nitrogen; passing free nitrogen in excess over said hydride to form aluminum nitride and ammonia mixed with the excess of nitrogen present; and passing said mixture of nitrogen and ammonia through a separator to recover the ammonia.

2. The process of making ammonia from free hydrogen and free nitrogen which consists in passing free nitrogen in excess over aluminum hydride at a reacting temperature above 400° C. to produce aluminum nitride and a mixture of nitrogen and ammonia; recovering the said ammonia and nitride; passing free hydrogen over said nitride at a reacting temperature to produce aluminum hydride and a mixture of hydrogen and a second quantity of ammonia; and also recovering said last named ammonia.

3. The herein described cyclic process of making ammonia from free hydrogen and nitrogen which consists in heating aluminum hydride to a temperature above 300° C.; passing free nitrogen in excess over said heated hydride to produce aluminum nitride and a mixture of free nitrogen and ammonia gases; withdrawing said mixture from the reaction zone as fast as it is formed and separating and recovering the excess of nitrogen and the ammonia present; passing free hydrogen in excess over the aluminum nitride thus produced at a temperature below 300° C. to reproduce a supply of aluminum hydride and also a mixture of ammonia and free hydrogen; withdrawing said last named mixture from the reaction zone as fast as it is formed; and separating and recovering said ammonia and excess of hydrogen.

4. The process of making ammonia which consists in heating aluminum nitride to a temperature at which it will react with hydrogen; passing free hydrogen in excess over said nitride to form aluminum hydride and ammonia mixed with the excess of hydrogen present; and passing said mixture of hydrogen and ammonia through a separator to recover the ammonia.

In testimony whereof I affix my signature.

SAMUEL PEACOCK.